United States Patent Office 3,061,589
Patented Oct. 30, 1962

3,061,589
STABILIZING HIGH MOLECULAR WEIGHT FORMALDEHYDE POLYMERS BY REACTION WITH DIAZOMETHANE
Franco Codignola and Gerhard K. E. Vogel, Milan, Italy, assignors to Societa Italiana Resine, Milan, Italy
No Drawing. Filed Jan. 4, 1961, Ser. No. 80,554
Claims priority, application Italy Jan. 11, 1960
4 Claims. (Cl. 260—67)

This invention relates to stabilization of high polymers of formaldehyde by blocking the terminal hydroxyl groups through chemical reaction with a stabilizing agent.

It has long been known that high molecular weight polymers of formaldehyde can be stabilized by esterification of the terminal hydroxyl groups with acetic anhydride. This esterification confers to the treated polymers a high thermal stability. The abovementioned polymers can be stabilized also by etherification with methanol in the presence of an acidic catalyst (H. Staudinger, "Die hochmolekularen organischen Verbindungen," Springer, Berlin, 1932, page 230 and following pages, and J. F. Walker, "Formaldehyde," Reinhold Publ. Corp., New York, 1953, pages 133–137). The known processes are objectionable under various aspects, for they should be carried out with a large excess of stabilizing agent which results in a high heat consumption and relatively heavy loss of reagent (acetic anhydride or methanol), the polymer moreover undergoing an appreciable degradation.

It has now been found that the terminal groups of high polymers of formaldehyde can be etherified under decidedly simpler and less expensive conditions by reacting the said groups with diazomethane in inert solvents in the presence of boron trifluoride and/or fluoboric acid or an agent capable of forming alkoxo-acids with the hydroxyl groups of the polymers. The resulting products exhibit at 222° C. a thermal stability constant lower than 1% per minute. The infrared spectrum analysis of the stabilized polymer no longer discloses any trace of free hydroxyl groups.

Generally, the reaction is carried out by suspending the high formaldehyde polymer in an inert solvent in the presence of 0.25 to 25 mol percent boron trifluoride and/or fluoboric acid and adding a solution of diazomethane in a suitable solvent, the temperature being kept within a range of −50° and +25° C. The reaction is pursued till a sharp yellow coloring of a persistent character is reached. The reaction product is filtered, the resulting polymer is suspended in 5% sodium carbonate solution, filtered and thoroughly washed with water to neutral reaction, whereupon it is dried in an oven at 45° C. at a reduced pressure. Alternatively, stabilization is carried out by reacting the high polymers before treatment thereof with diazomethane, with products, such as aluminum alcoholates which form together with the terminal hydroxyl groups alkoxo-acids, the latter being subsequently etherified with diazomethane in an anhydrous inert medium. The latter reaction also is preferably carried out at the abovementioned temperatures.

The following examples are explanatory of the invention, but should not be understood as limitations thereof.

*Example 1*

120 grams formaldehyde polymer of high molecular weight in a finely subdivided condition, of about 2.6 viscosity (in a 0.5% solution in p-chlorophenol with 2% alpha-pinene, the viscosity being calculated as $$\left(\frac{\eta \text{ solution}}{\eta \text{ solvent}} - 1\right)$$

is suspended in 2 liters absolute ether in a 5 liters-flask provided with a stirrer, a funnel with a cock, gas bubbler and a condenser connected with a dehydrating trap. While vigorously stirring at 0° C. 0.7 gram boron trifluoride is added followed by the addition during 1½ hours' vigorous stirring of 0.5 gram diazomethane dissolved in 500 cc. absolute ether. Stirring is pursued during further 20 minutes following the addition of diazomethane, whereupon the suspended product is filtered, washed with hot water and ultimately with methanol, and is dried in an oven at 45° C. at a reduced pressure. The resulting polymer is of a 2.5 viscosity (determined as explained above), and of thermal stability constant at 222° of 0.08 expressed as loss percent per minute, determined by the method described by M. A. Naylor and A. W. Anderson in J. Am. Chem. Soc., 76, 3962 (1954).

*Example 2*

120 grams polyformaldehyde of high molecular weight in a finely subdivided condition of a 1.9 viscosity determined as explained in Example 1 is poured into a 3 liter flask equipped as explained in Example 1 containing 1 liter anhydrous tetrahydrofurane admixed with 0.9 gram fluoboric acid, the temperature of the reaction mixture being brough to −5° C. During 30 minutes while steadily stirring 0.7 gram diazomethane dissolved in 250 cc. anhydrous tetrahydrofurane are added. Stirring is pursued during further 30 minutes after completion of the addition of the diazomethane solution, whereupon the polymer is treated as indicated in Example 1. The stabilized polymer is of a 1.85 viscosity and a thermal stability at 222° C. of 0.1% per minute.

*Example 3*

In a 3 liter flask having four necks equipped with a stirrer, a condenser connected with a dehydrating trap, a gas bubbler and a funnel with a cock, 120 grams polyformaldehyde of high molecular weight and 3.5 viscosity, together with 1,500 cc. absolute ether are poured. The polymer should be finely pulverised. 7.5 mg. aluminium tri-isobutylate are then added and stirring is continued at room temperature during 45 minutes. The reaction mixture is brought to 0° C., whereupon 0.7 gram diazomethane dissolved in 300 cc. absolute ether is introduced during 30 minutes while stirring. Stirring is thereafter continued during 45 minutes, the stabilized polymer being then treated as described in Example 1. The stabilized polymer is of a 3.3 viscosity and exhibits a heat stability constant at 222° C. of 0.07% per minute.

What we claim is:

1. Method of stabilizing formaldehyde homopolymers of high molecular weight comprising reacting the polymer suspended in an inert solvent with diazomethane in the presence of a catalyst selected from the group consisting of boron trifluoride and fluoboric acid.

2. A method of stabilizing a formaldehyde homopolymer of high molecular weight consisting in converting terminal hydroxyl groups of the homopolymer to methyl ether groups by means of diazomethane at a conversion temperature of −50° C. to +25° C.

3. A method of stabilizing a formaldehyde homopolymer of high molecular weight comprising reacting the polymer with an aluminum alcoholate thereby to obtain a corresponding alkoxo-acid, and then etherifying the alkoxo-acid by diazomethane.

4. A method as claimed in claim 3, wherein the aluminum alcoholate is aluminum triisobutylate.

References Cited in the file of this patent
UNITED STATES PATENTS
2,512,950    Londergan _____ June 27, 1950
OTHER REFERENCES
Chem. Abstracts, vol. 31, p. 3447.